(12) United States Patent
Fukuda et al.

(10) Patent No.: US 11,014,562 B2
(45) Date of Patent: May 25, 2021

(54) SUPPORT DEVICE

(71) Applicant: DENSO CORPORATION, Kariya (JP)

(72) Inventors: Shotaro Fukuda, Kariya (JP); Hiroaki Niino, Kariya (JP); Koji Fujiki, Kariya (JP)

(73) Assignee: DENSO CORPORATION, Aichi-pref (JP)

( * ) Notice: Subject to any disclaimer, the term of this patent is extended or adjusted under 35 U.S.C. 154(b) by 239 days.

(21) Appl. No.: 16/092,901

(22) PCT Filed: Apr. 14, 2017

(86) PCT No.: PCT/JP2017/015324
§ 371 (c)(1),
(2) Date: Oct. 11, 2018

(87) PCT Pub. No.: WO2017/179710
PCT Pub. Date: Oct. 19, 2017

(65) Prior Publication Data
US 2019/0185005 A1 Jun. 20, 2019

(30) Foreign Application Priority Data
Apr. 15, 2016 (JP) .............................. JP2016-082231

(51) Int. Cl.
| B60W 30/18 | (2012.01) |
| B60W 30/16 | (2020.01) |
| G08G 1/16 | (2006.01) |
| B60W 30/09 | (2012.01) |

(Continued)

(52) U.S. Cl.
CPC ...... *B60W 30/18163* (2013.01); *B60W 30/09* (2013.01); *B60W 30/10* (2013.01); *B60W 30/16* (2013.01); *B60W 40/04* (2013.01); *G08G 1/16* (2013.01); *B60W 2554/801* (2020.02); *B60W 2554/804* (2020.02); *B60W 2720/10* (2013.01)

(58) Field of Classification Search
CPC .............................................. B60W 30/18163
See application file for complete search history.

(56) References Cited

U.S. PATENT DOCUMENTS 9,718,473 B2 * 8/2017 Suzuki ................. B60W 30/16
10,108,195 B2 * 10/2018 Silvlin ................... G08G 1/167
(Continued)

FOREIGN PATENT DOCUMENTS

| JP | 2008-094111 A | 4/2008 |
| JP | 2015-066963 A | 4/2015 |

*Primary Examiner* — Michael A Berns
(74) *Attorney, Agent, or Firm* — Maschoff Brennan

(57) ABSTRACT

A detection unit detects one of a plurality of inter-vehicle areas as an area candidate where the own vehicle can perform lane change. A calculation unit calculates a required inter-vehicle distance which should be secured between the own vehicle and a nearby vehicle upon lane change to the area candidate. An extraction unit extracts, within preset allowable ranges, a standby time and a target speed used for estimating an estimated inter-vehicle distance as lane change conditions which are conditions for the estimated inter-vehicle distance to be equal to or more than the required inter-vehicle distance. When the lane change conditions are extracted, and a determining unit determines that lane change is possible, a setting unit sets the area candidate as the lane change area.

9 Claims, 11 Drawing Sheets

(51) Int. Cl.
*B60W 30/10* (2006.01)
*B60W 40/04* (2006.01)

(56) References Cited

U.S. PATENT DOCUMENTS 10,388,166 B2 * 8/2019 Takeda ............ B60W 30/18163
10,621,869 B2 * 4/2020 Yamamoto ............. B60R 21/00

* cited by examiner

SUPPORT DEVICE

CROSS REFERENCE TO RELATED APPLICATION

The present international application is a national stage application under 35 U.S.C. § 371(c) of PCT Application No. PCT/JP2017/015324, filed on Apr. 14, 2017, which is based on and claims the benefit of priority from earlier Japanese Patent Application No. 2016-82231 filed to the Japan Patent Office on Apr. 15, 2016, and the entire contents of Japanese Patent Application No. 2016-82231 are incorporated herein by reference.

TECHNICAL FIELD

The present disclosure relates to a technique for supporting lane change.

BACKGROUND ART

PTL 1 discloses a driving support device that supports driving. When it is determined that the vehicle cannot change its lane to the adjacent lane, and the row of vehicles traveling in the adjacent lane is moving faster than the own vehicle, the driving support device performs the following control. That is, it decelerates the own vehicle to secure a distance between the own vehicle and the vehicle in front of it that is necessary for accelerating the own vehicle. The own vehicle is then accelerated using the secured distance, and then the lane is changed to the adjacent lane.

CITATION LIST

Patent Literature

[PTL 1] JP 2015-66963 A

SUMMARY OF THE INVENTION

However, as a result of detailed examination by the inventor, the following problem was found with the above technique. That is, even if the own vehicle is accelerated by using the distance between the own vehicle and the vehicle in front of it secured by deceleration, the difference in speed between the row of vehicles traveling in the adjacent lane and the own vehicle may not become less than that before the deceleration. In such a case, when the vehicle changes its lane to the adjacent lane, the inter-vehicle distance between the own vehicle and the vehicle behind of it in the adjacent lane may decrease in a short period of time, and the driver/passenger may feel discomfort.

The present disclosure is to provide a technique for performing lane change without making the occupants feel discomfort.

A support device according to an aspect of the present disclosure supports lane change of the own vehicle.

The support device includes a detection unit, a calculation unit, an extraction unit, an extraction unit, a determining unit, a setting unit, and a supporting unit.

The detection unit detects one of a plurality of inter-vehicle areas in an adjacent lane as an area candidate which is a candidate for an area to which the own vehicle can perform lane change. The adjacent lane is a lane adjacent to the own lane in which the own vehicle is traveling. The inter-vehicle area is an area sandwiched between two adjacent vehicles in an anterior-posterior relationship with each other, the adjacent vehicles being vehicles traveling in the adjacent lane.

The calculation unit calculates a required inter-vehicle distance which is a distance that should be secured between the own vehicle and a nearby vehicle when the own vehicle can perform lane change to the area candidate. The nearby vehicles are vehicles traveling nearby the own vehicle when the own vehicle enters the area candidate to change lanes.

The extraction unit extracts, within preset allowable ranges, a standby time and a target speed used for estimating an estimated inter-vehicle distance as lane change conditions which are conditions for the estimated inter-vehicle distance to be equal to or more than the required inter-vehicle distance. The standby time is the time for which the support device waits until the own vehicle changes its lane to the area candidate. The target speed is a target traveling speed of the own vehicle used as a target when performing speed adjustment to reduce a speed difference with respect to the adjacent vehicles after the standby time has elapsed. The estimated inter-vehicle distance is an estimated distance between the own vehicle and the nearby vehicle when speed adjustment is performed so that the traveling speed of the own vehicle reaches the target speed after the standby time has elapsed.

The determining unit determines that lane change to the area candidate is possible when the extraction unit has extracted the lane change conditions, and determines that lane change to the area candidate is impossible when the extraction unit has not extracted the lane change conditions.

The setting unit sets the area candidate as a lane change area which is an area to which the own vehicle can perform lane change when the determining unit determines that lane change to the area candidate is possible.

When the setting unit has set the lane change area, the supporting unit stands by until the standby time elapses, performs speed adjustment so that a traveling speed of the own vehicle reaches the target speed, and performs lane change to the lane change area of the own vehicle.

According to such configuration, by adjusting the speed to the target speed, it is possible to reduce the speed difference between the own vehicle and the adjacent vehicles at the time of lane change. Therefore, it is possible to prevent the inter-vehicle distance between the own vehicle and an adjacent vehicle decreasing in a short period of time after lane change, and further to prevent the occupant from feeling discomfort.

That is, it is possible to perform lane change without making the occupant feel discomfort.

DESCRIPTION OF THE EMBODIMENTS

Embodiments of the present disclosure will be described below with reference to the drawings.

1. Overall Configuration

The configuration of a support device 1 will be described with reference to FIGS. 1 and 2. The support device 1 is a vehicle-mounted device mounted on a vehicle. Hereinafter, the vehicle on which the support device 1 is mounted will be referred to as the own vehicle. The support device 1 has a function of supporting lane change of the own vehicle.

The central component of the support device 1 is a well-known microcomputer having a CPU 3 and a memory 5. The memory 5 is a semiconductor memory such as RAM, ROM, a flash memory, and the like. The various functions of the support device 1 are realized by the CPU 3 executing programs stored in a non-transitory computer readable recording medium. In this example, the memory 5 corresponds to the non-transitory computer readable recording medium for storing programs. Further, a method corresponding to one or more programs is executed by execution of the one or more programs. The number of microcomputers constituting the support device 1 may be one or more.

Figure 1:
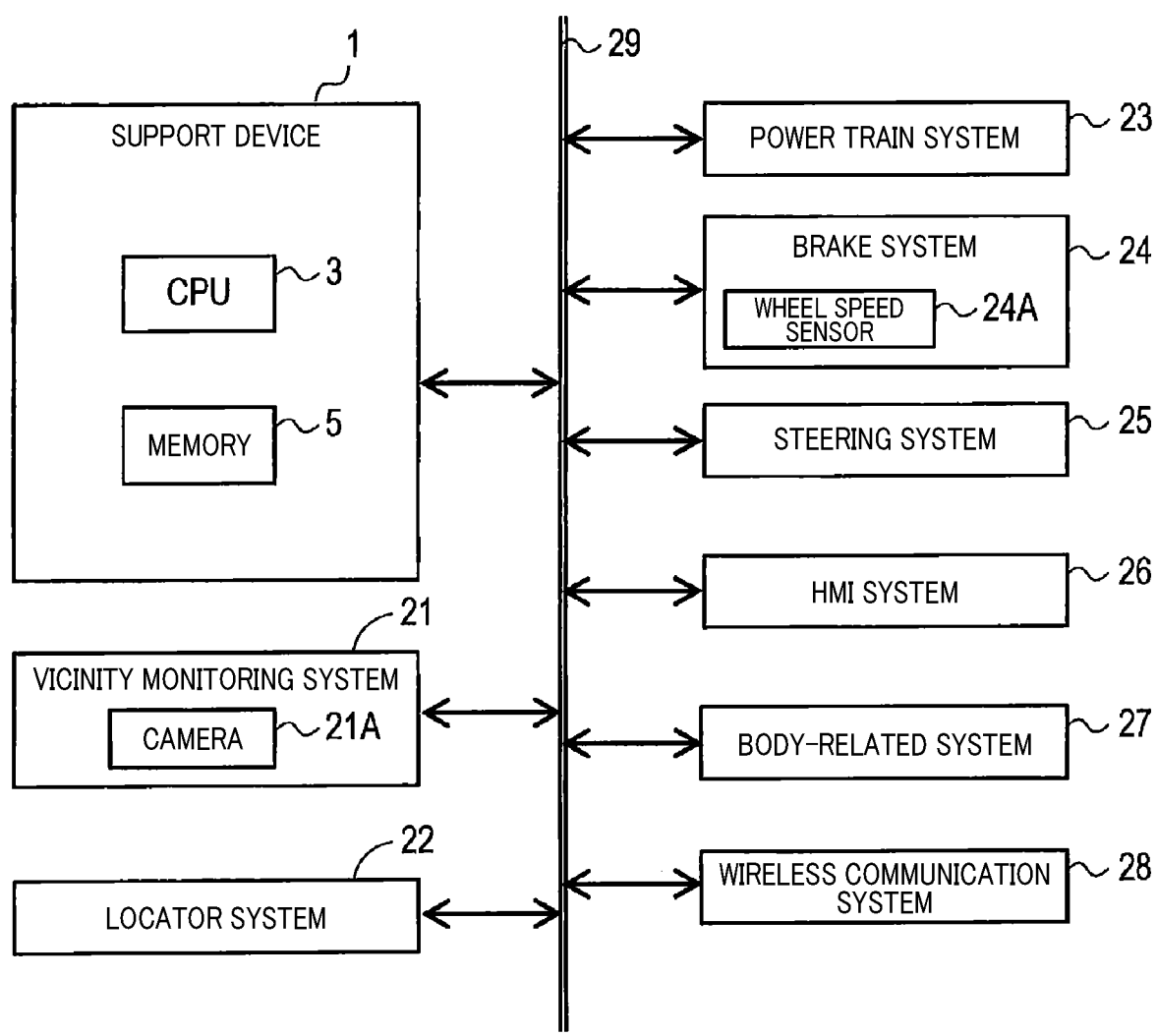
FIG. 1 is a block diagram showing a support device 1 and a configuration related thereto.
Figure 2:
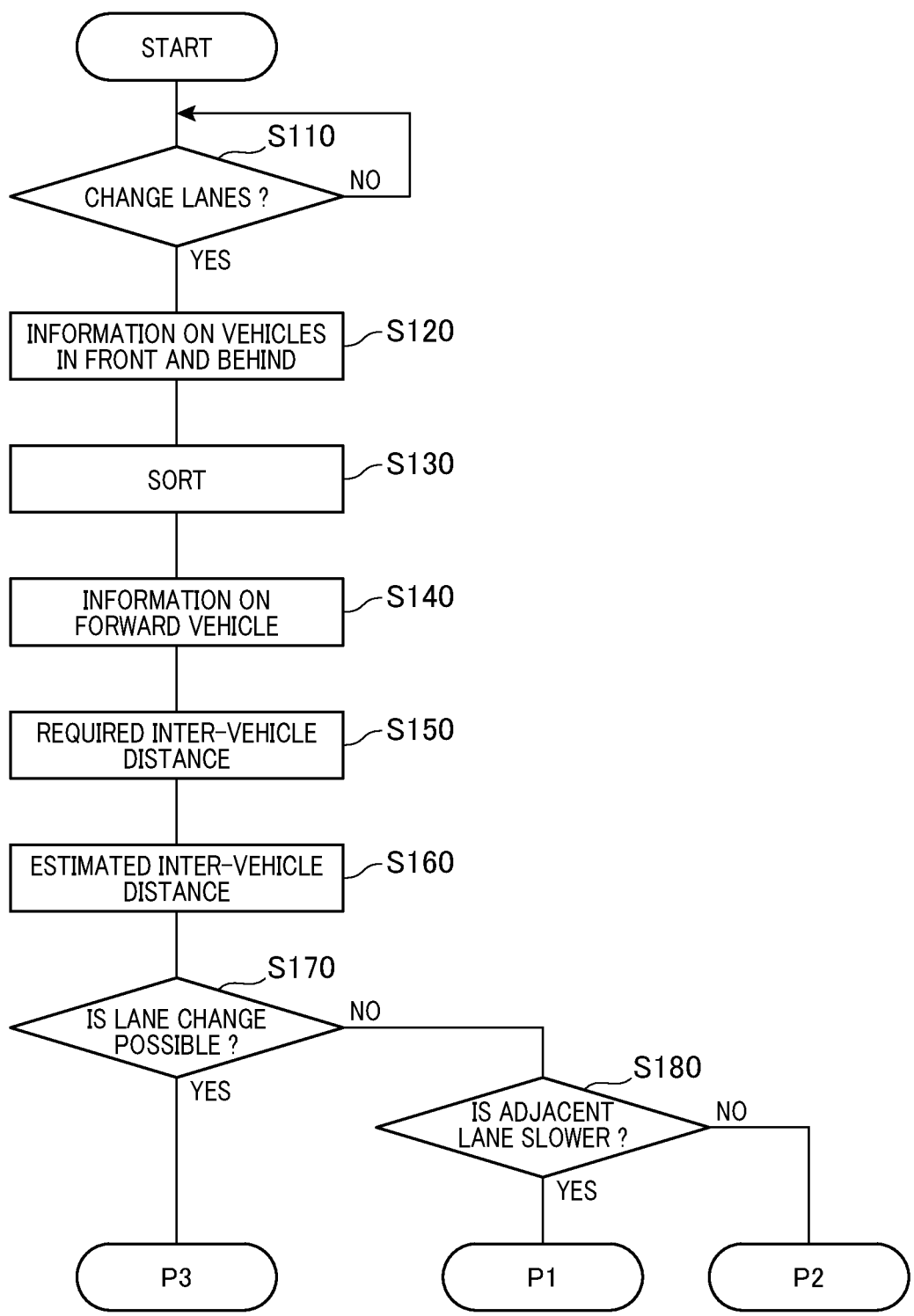
FIG. 2 is a flowchart showing the support process.
Figure 3:
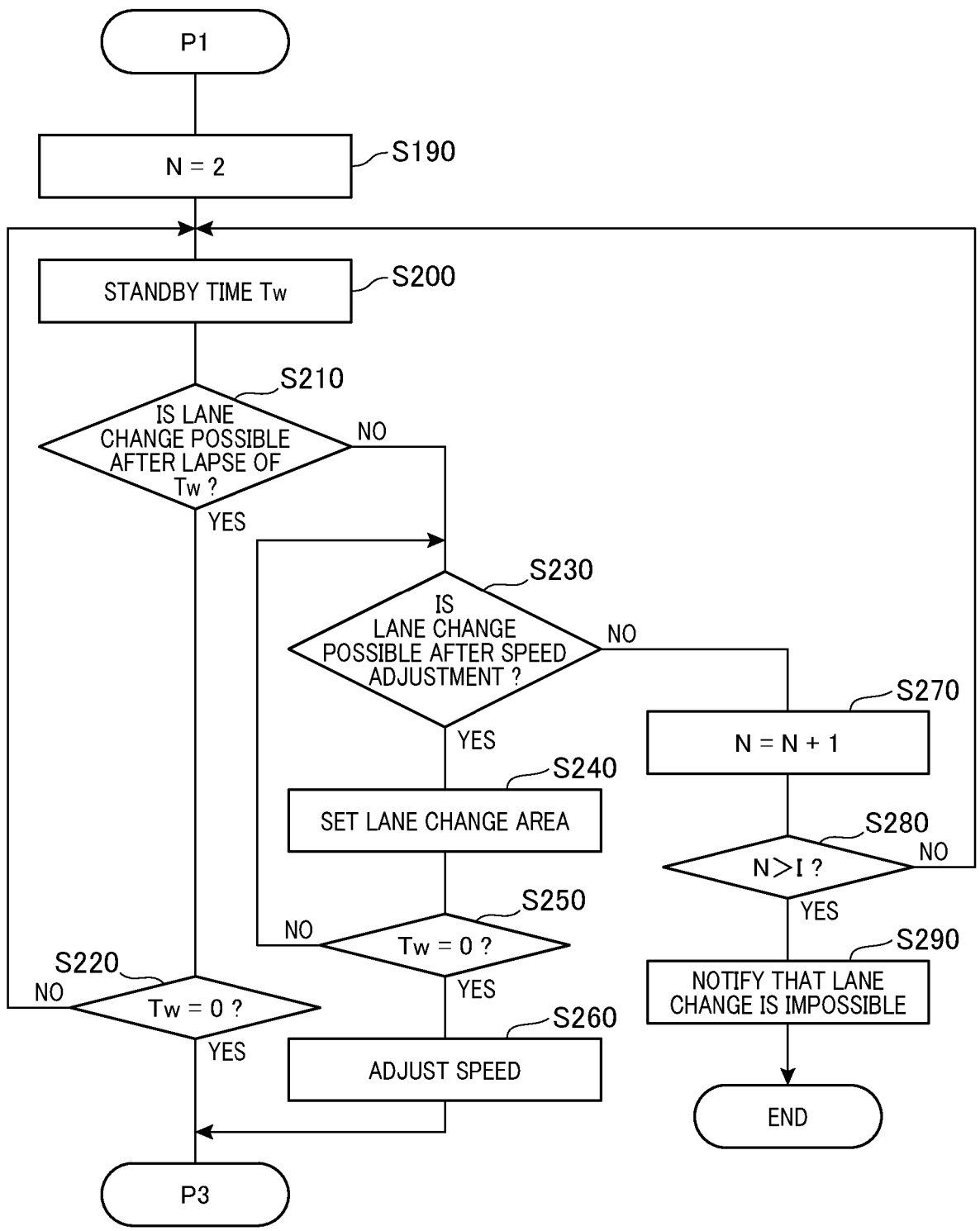
FIG. 3 is a flowchart showing the support process.
Figure 4:
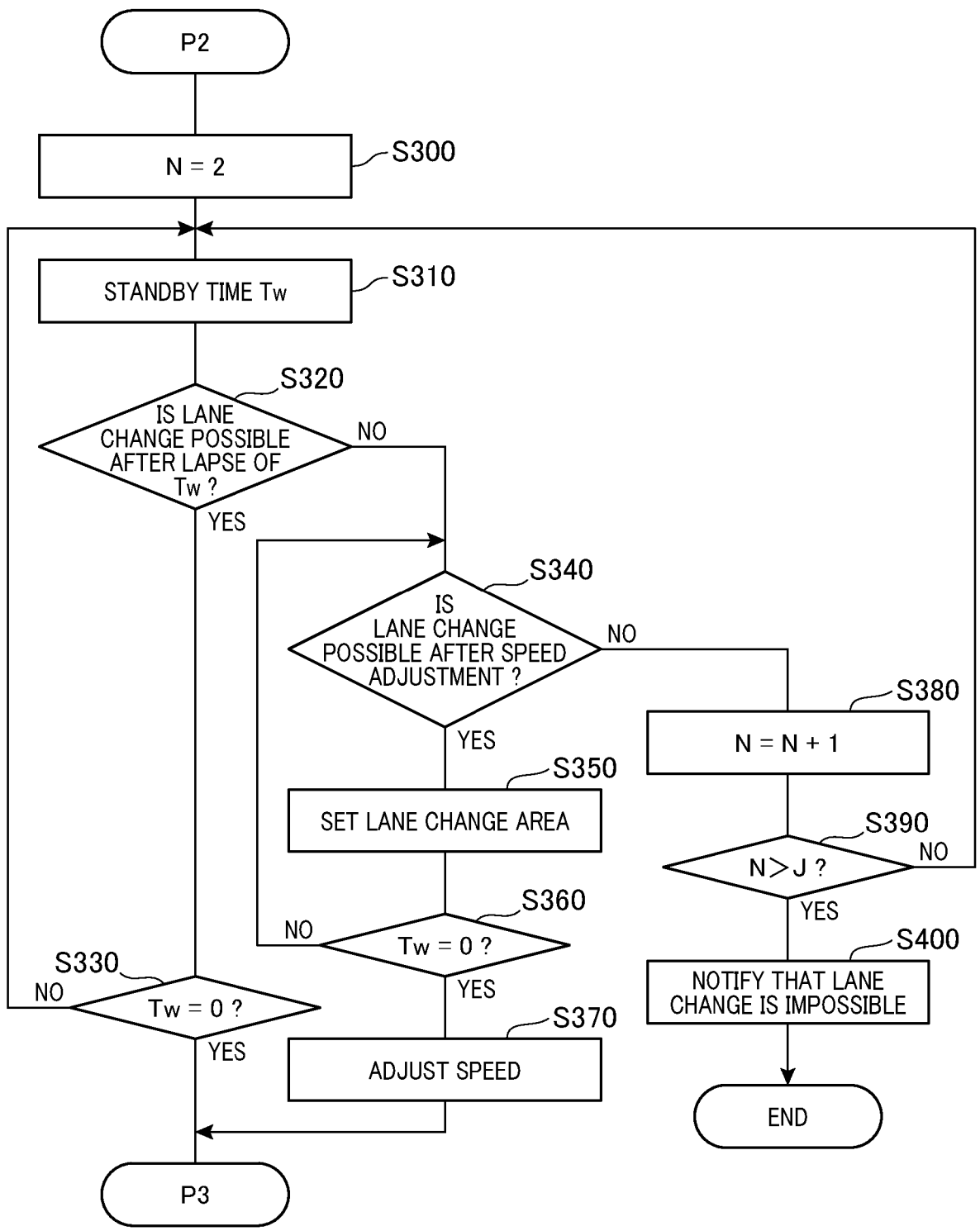
FIG. 4 is a flowchart showing the support process.
Figure 5:
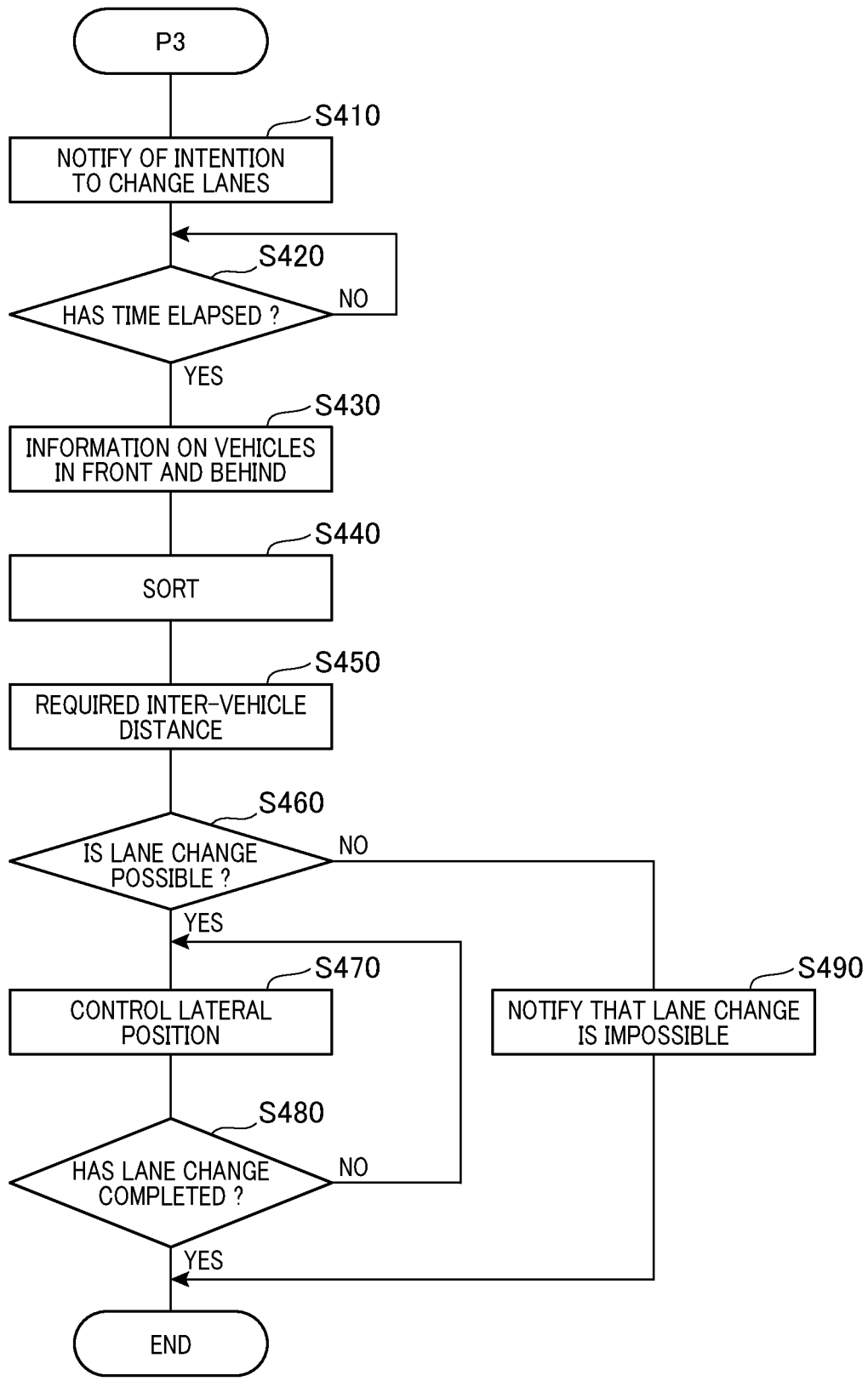
FIG. 5 is a flowchart showing the support process.

As shown in FIG. 1, in addition to the support device 1, the own vehicle includes a vicinity monitoring system 21, a locator system 22, a power train system 23, a brake system 24, a steering system 25, an HMI system 26, a body-related system 27, and a wireless communication system 28. HMI represents human machine interface.

The vicinity monitoring system 21 includes a camera 21A and other well-known sensors. The camera 21A takes images of the surroundings of the own vehicle and creates image data. The vicinity monitoring system 21 sends the image data created by the camera 21A and the detection results of the other sensors to the support device 1.

The locator system 22 includes a GPS and a storage device storing map information. The locator system 22 has a function of acquiring the position of the own vehicle. The locator system 22 sends the positional information of the own vehicle to the support device 1.

The power train system 23 has a function of controlling the power train of the own vehicle. The brake system 24 has a function of performing the braking operation of the own vehicle. Further, the brake system 24 includes a wheel speed sensor 24A. The wheel speed sensor 24A detects the rotation speed of the wheels of the own vehicle as a signal. The brake system 24 sends the detection signal of the wheel speed sensor 24A to the support device 1. The support device 1 can calculate the speed of the own vehicle by using the detection signal of the wheel speed sensor 24A. The steering system 25 has a function of performing the steering of the own vehicle.

The HMI system 26 accepts the operations of an occupant in the own vehicle. In addition, the HMI system 26 notifies the occupant of the own vehicle of various information on the own vehicle.

The body-related system 27 has a function of performing door lock control, light control, lighting control of the turn signals (blinkers), notification of the state of the turn signals, and the like of the own vehicle. The wireless communication system 28 has a function of performing inter-vehicle communication and communication between the vehicle and the infrastructure.

The support device 1, vicinity monitoring system 21, locator system 22, power train system 23, brake system 24, steering system 25, HMI system 26, body-related system 27, and wireless communication system 28 are components of the own vehicle. The components are mutually connected by an in-vehicle LAN 29. The components can transmit and receive information via the in-vehicle LAN 29.

2. Processing

Next, the lane change support processing executed by the support device 1 will be described with reference to the flowcharts of FIGS. 2 to 5.

In the first step S110, the support device 1 determines whether lane change should be performed. Specifically, when the support device 1 detects at least one of the intention to change lanes of the driver and the intention to change lanes of the system, it determines that lane change should be performed. When steering operation or turn signal operation is detected, the support device 1 determines that the driver has the intention of changing lanes. When a lane change request output by the vicinity monitoring system 21, the locator system 22, and the like is detected, the support device 1 determines that the system has the intention to change lanes. The support device 1 determines the presence/absence of a lane change request based on the information output by the vicinity monitoring system 21, the locator system 22, and the like, and determines that the system has the intention to change lanes if there is a lane change request. When it is determined that lane change should be performed, the process proceeds to S120. When the support device 1 detects neither of the intention to change lanes of the driver and the intention to change lanes of the system, it determines that lane change should not be performed. When it is determined that lane change should not be performed, S110 is performed again.

Figure 6:
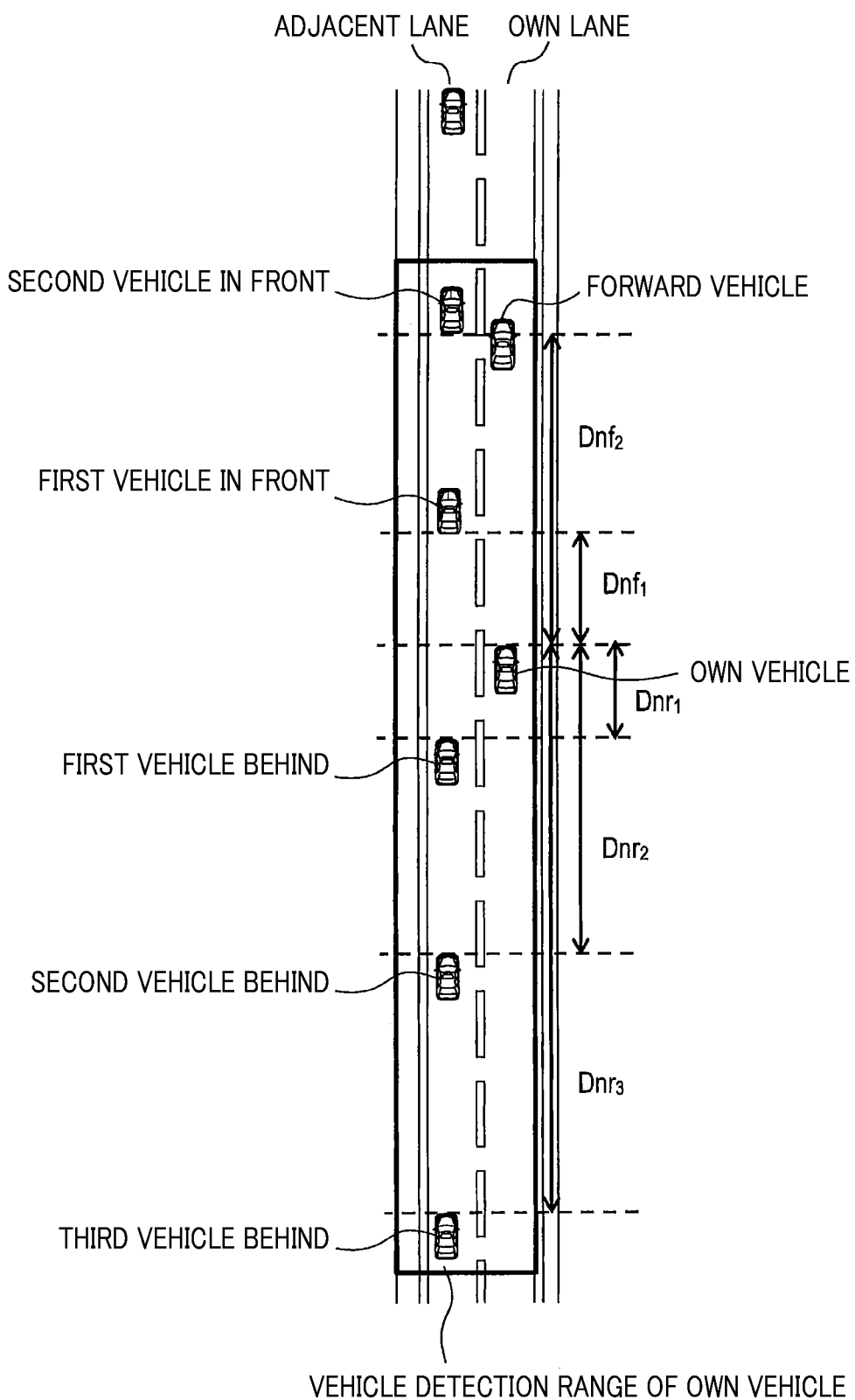
FIG. 6 is an explanatory diagram of the support process.

In S120, the support device 1 acquires information on the vehicles in front and behind. The vehicles in front and behind are vehicles traveling in an adjacent lane. The adjacent lane is a lane adjacent to the own lane. The own lane is a lane in which the own vehicle is traveling. The adjacent lane is the lane to which the own vehicle should change its lane. The vehicles in front and behind include vehicle(s) in front and vehicle(s) behind. The vehicles in front are those of the vehicles in front and behind that are traveling ahead of the own vehicle. The vehicles behind are those of the vehicles in front and behind that are traveling behind the own vehicle. The vehicles in front and behind correspond to adjacent vehicles. FIG. 6 illustrates the positional relationship of the own vehicle and the vehicles in front and behind. The support device 1 inputs the number of detected vehicles in front to a variable I. When no vehicle in front is detected, the support device 1 inputs the numerical value 1 to the variable 1. The support device 1 inputs the number of detected vehicles behind to a variable J. When no vehicle behind is detected, the support device 1 inputs the numerical value 1 to the variable J. The support device 1 detects area candidates. An area candidate is one of the inter-vehicle areas, and it is a candidate for the area which the own vehicle should move into upon lane change. An inter-vehicle area is an area sandwiched between two serially adjacent vehicles. Here, the support device 1 detects the inter-vehicle area having the smallest distance from the own vehicle as the area candidate. Using the wireless communication system 28, the support device 1 acquires the relative speeds Vnf of the vehicles in front and the relative distances Dnf of the vehicles in front, and also acquires the relative speeds Vnr of the vehicles behind and the relative distances Dnr of the vehicles behind. After that, the process proceeds to S130.

In S130, the support device 1 sorts the information on the vehicles in front and behind. Specifically, the support device 1 sorts the information on the vehicles in front in ascending order of the relative distance Dnf and sorts the information on the vehicles behind in ascending order of the relative distance Dnr. After that, the process proceeds to S140.

In S140, the support device 1 acquires information on the forward vehicle (leading vehicle). Specifically, using the wireless communication system 28, the support device 1 acquires the relative speed Vf of the forward vehicle and the relative distance Df of the forward vehicle. The forward vehicle is the vehicle traveling ahead of the own vehicle in the own lane. After that, the process proceeds to S150.

In S150, the support device 1 calculates a required inter-vehicle distance. The required inter-vehicle distance is the distance to be secured between the own vehicle and the nearby vehicles when the own vehicle changes lanes. The nearby vehicles are vehicles traveling nearby the own vehicle when the own vehicle enters the area candidate to change lanes. The vehicles in front and behind, and the forward vehicle correspond to nearby vehicles. The support device 1 calculates the required inter-vehicle distance $Dnr_{th}$ for the vehicles behind. The required inter-vehicle distance $Dnr_{th}$ is calculated according to Equation (1). The support device 1 calculates the required inter-vehicle distance $Dnf_{th}$ for the vehicles in front. The required inter-vehicle distance $Dnf_{th}$ is calculated according to Equation (2).

[Eq. 1]

$$Dnr_{th} = \begin{cases} a_1 \Delta V + b_1 V + c_1 & (\Delta V_f \geq \Delta V_1) \\ Dnr_{th\_min} & (\Delta V_f < \Delta V_1) \end{cases} \quad (1)$$

$$Dnf_{th} = \begin{cases} a_2 \Delta V + b_2 V + c_2 & (\Delta V_f < \Delta V_2) \\ Dnf_{th\_min} & (\Delta V_f \geq \Delta V_2) \end{cases} \quad (2)$$

In Equation (1), $\Delta V$ and $\Delta Vf$ are relative speeds of the own vehicle and the vehicle behind. $a_1$ is the estimated time until the vehicle behind collides with the own vehicle when there is a speed difference between the own vehicle and the vehicle behind upon lane change. $b_1$ is the inter-vehicle time that should be secured between the own vehicle and the vehicle behind when there is no speed difference between the own vehicle and the vehicle behind upon lane change. $a_1$, $b_1$, $c_1$, $Dn_{rth\_min}$, and $\Delta V_1$ are preset in consideration of the responsiveness of the occupant of the own vehicle and the occupant of the vehicle behind. The product of at and $\Delta V$ is the distance to be secured for the own vehicle or the vehicle behind to adjust speed after the lane change. The product of $b_1$ and V is the distance to be secured between the own vehicle and the vehicles in front and behind after the own vehicle or the vehicle behind has adjusted the speed. $c_1$ is the distance to be secured between the own vehicle and the vehicle behind when both the own vehicle and the vehicle behind are stopped.

In Equation (2), $\Delta V$ and $\Delta Vf$ are relative speeds of the own vehicle and the vehicle in front, $a_2$ is the estimated time until the own vehicle collides with the vehicle in front when there is a speed difference between the own vehicle and the vehicle in front upon lane change. $b_2$ is the inter-vehicle time that should be secured between the own vehicle and the vehicle in front when there is no speed difference between the own vehicle and the vehicle in front upon lane change. $a_2$, $b_2$, $c_2$, $Dnf_{th\_min}$, and $\Delta V_2$ are preset in consideration of the responsiveness of the occupant of the own vehicle and the occupant of the vehicle in front. The product of $a_2$ and $\Delta V$ is the distance to be secured for the own vehicle or the vehicle in front to adjust speed after the lane change. The product of $b_2$ and V is the distance to be secured between the own vehicle and the vehicles in front and behind after the own vehicle or the vehicle in front has adjusted the speed. $c_2$ is the distance to be secured between the own vehicle and the vehicle in front when both the own vehicle and the vehicle in front are stopped.

After that, the process proceeds to S160.

In S160, the support device 1 calculates an estimated inter-vehicle distance. The estimated inter-vehicle distance is the distance between the own vehicle and a nearby vehicle, which is estimated after the lapse of a standby time. The standby time is the time for which the support device waits until the own vehicle changes its lane to the area candidate. A target speed is the target traveling speed of the own vehicle used as the target when adjusting the speed to reduce the speed difference with respect to the vehicles in front and behind after the lapse of the standby time. The support device 1 calculates the estimated inter-vehicle distance $Dnf_{es\_1}$ between the own vehicle and the first vehicle in front (hereinafter referred to as the vehicle immediately in front). The estimated inter-vehicle distance $Dnf_{es\_1}$ is calculated according to Equation (3). The support device 1 calculates the estimated inter-vehicle distance $Dnr_{es\_1}$ between the own vehicle and the first vehicle behind (hereinafter referred to as the vehicle immediately behind). The estimated inter-vehicle distance $Dnr_{es\_1}$ is calculated according to Equation (4).

[Eq. 2]

$$Dnf_{es_1} = Dnf_1 + \Delta Vnf_1 \cdot Tw \quad (3)$$

$$Dnr_{es_1} = Dnr_1 + \Delta Vnr_1 \cdot Tw \quad (4)$$

In Equation (3), $Dnf_1$ is the relative distance to the vehicle immediately in front. $\Delta Vnf_1$ is the relative speed with respect to the vehicle immediately in front. Tw is the standby time. In Equation (4), $Dnr_1$ is the relative distance to the vehicle immediately behind. $\Delta Vnr_1$ is the relative speed with respect to the vehicle immediately behind.

The standby time Tw used to calculate the estimated inter-vehicle distance $Dn_{fes_1}$ with respect to the vehicle immediately in front is calculated according to Equation (5). The standby time Tw used to calculate the estimated inter-vehicle distance $Dnr_{es\_1}$ with respect to the vehicle immediately behind is calculated according to Equation (6).

[Eq. 3]

$$Tw = \frac{(Dnf_{th} - Dnf_1)}{\Delta Vnf_1} \quad (5)$$

$$Tw = \frac{(Dnf_{th} - Dnr_1)}{\Delta Vnr_1} \quad (6)$$

After that, the process proceeds to S170.

In S170, the support device 1 determines whether lane change to the area candidate is possible. Specifically, the support device 1 determines that lane change to the area candidate is possible when both of the following conditions (A) and (B) are met. Otherwise, it is determined that lane change to the area candidate is impossible. The area candidate in this case is the area sandwiched between the vehicle immediately in front and the vehicle immediately behind. When it is determined that lane change is possible, the process proceeds to S410. When it is determined that lane change is impossible, the process proceeds to S180.

Figure 8:
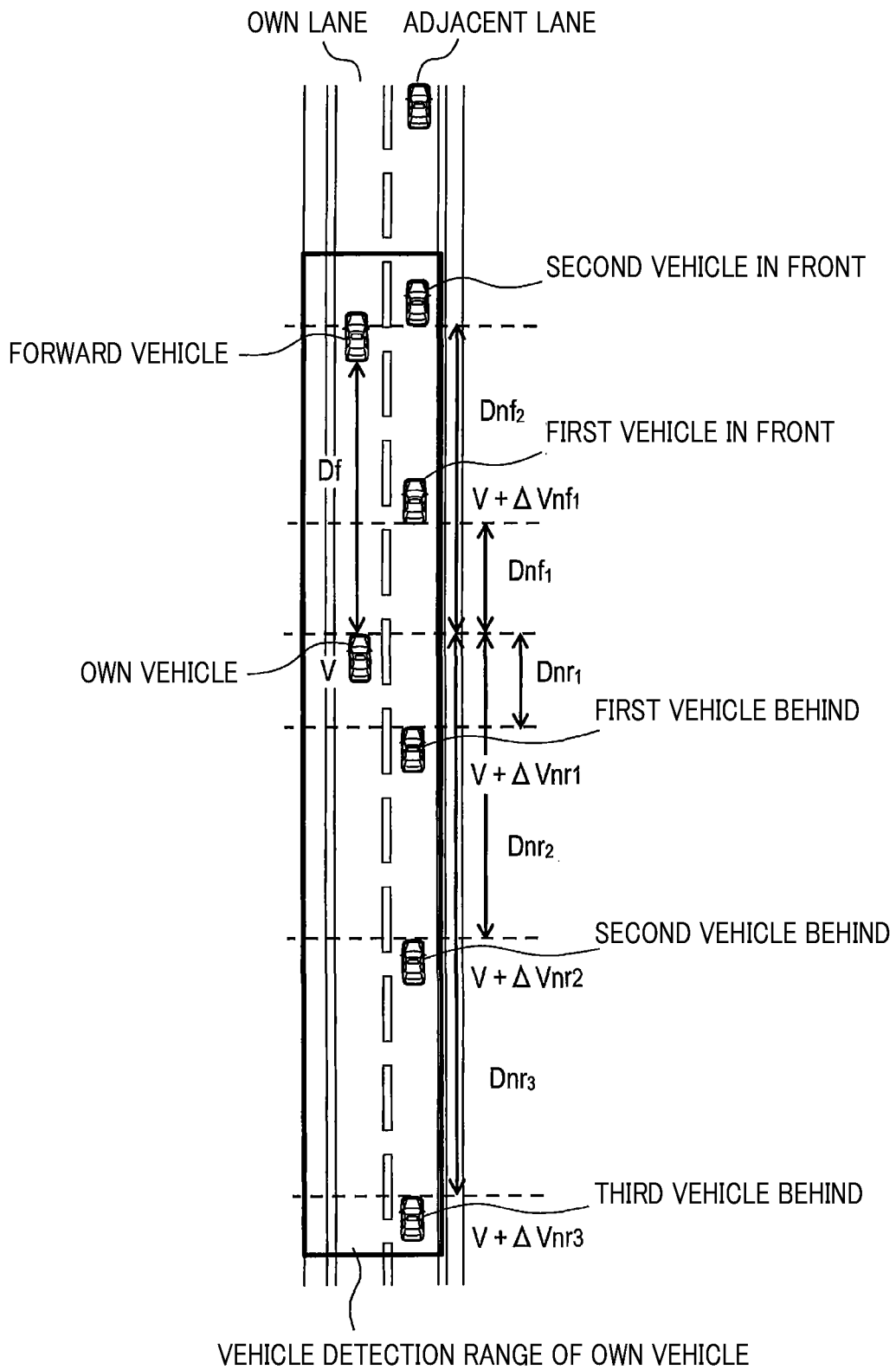
FIG. 8 is an explanatory diagram of the support process.

(A) The estimated inter-vehicle distance $Dnf_{es\_1}$ is equal to or more than the required inter-vehicle distance $Dnf_{th}$ (B) The estimated inter-vehicle distance $Dnr_{es\_1}$ is equal to or more than the required inter-vehicle distance $Dnr_{th}$ In S180, the support device 1 determines whether the row of vehicles in the adjacent lane is traveling more slowly than the own vehicle. Specifically, when the value of the relative speed $\Delta Vnf_1$ between the own vehicle and the vehicle immediately in front is positive, the support device 1 determines that the row of vehicles in the adjacent lane is slower than the own vehicle. When the value of the relative speed $\Delta Vnf_1$ is negative, it determines that the row of vehicles in the adjacent lane is faster than the own vehicle. When it is determined that the row of vehicles in the adjacent lane is slower than the own vehicle, the process proceeds to S190. FIG. 6 shows an example of the positional relationship of the own vehicle and the vehicles in front and behind when it is determined that the row of vehicles in the adjacent lane is slower than the own vehicle. When it is determined that the row of vehicles in the adjacent lane is faster than the own vehicle, the process proceeds to S300. FIG. 8 shows an example of the positional relationship of the own vehicle and the vehicles in front and behind when it is determined that the row of vehicles in the adjacent lane is faster than the own vehicle.

In S190, the support device 1 sets the variable N to the numerical value 2. After that, the process proceeds to S200.

In S200, the support device 1 determines the standby time Tw Specifically, the support device 1 calculates the standby time Tw. The standby time Tw is calculated according to Equation (5). After that, the process proceeds to S210.

In S210, the support device 1 determines whether lane change to the area candidate is possible after the lapse of the standby time Tw. Specifically, the support device 1 determines that lane change to the area candidate is possible when both of the following conditions (C) and (D) are met. Otherwise, it is determined that lane change to the area candidate is impossible. The area candidate in this case is the area sandwiched between the N−1th vehicle in front and the Nth vehicle in front. When it is determined that lane change is possible, the process proceeds to S220. When it is determined that lane change is impossible, the process proceeds to S230.

(C) The estimated inter-vehicle distance $Dnf_{es\_n}$ is equal to or more than the required inter-vehicle distance $Dnf_{th}$ (D) The estimated inter-vehicle distance $Dnf_{es\_n-1}$ is equal to or more than the required inter-vehicle distance $Dnr_{th}$ The estimated inter-vehicle distance $Dnf_{es\_n}$ indicates the estimated inter-vehicle distance between the own vehicle and the Nth vehicle in front in the adjacent lane. The estimated inter-vehicle distance $Dnf_{es\_n-1}$ indicates the estimated inter-vehicle distance between the own vehicle and the N−1th vehicle in front in the adjacent lane. The estimated inter-vehicle distance $Dnf_{es\_n}$ is calculated according to Equation (7). The estimated inter-vehicle distance $Dnf_{es\_n-1}$ is calculated according to Equation (8).

[Eq. 4]

$$Dnf_{es_n}=Dnf_n+\Delta Vnf_n \cdot Tw \quad (7)$$

$$Dnf_{es_{n-1}}=Dnf_{n-1}+\Delta Vnf_{n-1} \cdot Tw \quad (8)$$

In Equation (7), $\Delta Vnf_n$ represents the relative speed between the own vehicle and the Nth vehicle in front. In Equation (8). $\Delta Vnf_{n-1}$ represents the relative speed between the own vehicle and the N−1th vehicle in front.

In S220, the support device 1 determines whether the standby time Tw is the numerical value zero. When the standby time Tw is the numerical value zero, the process proceeds to S410. When the standby time Tw is not the numerical value zero, the process proceeds to S200.

In S230, the support device 1 determines whether lane change to the area candidate is possible after speed adjustment. Specifically, the support device 1 extracts the standby time Tw the target speed $V_{es}$ of the own vehicle, the estimated inter-vehicle distance $Dnf_{es\_n}$, and the estimated inter-vehicle distance $Dnf_{es\_n-1}$ within the preset allowable ranges. The allowable ranges are ranges in which the traveling speed Vt of the own vehicle, the estimated inter-vehicle distance $Dnf_{es\_n}$, the estimated inter-vehicle distance $Dnf_{es\_n-1}$, the estimated relative speed $\Delta Vnf_{es\_n}$, and the estimated relative speed $\Delta Vnf_{es\_n-1}$ satisfy both of the following conditions (E) and (F). The extracted standby time Tw, target speed $V_{es}$ of the own vehicle, estimated inter-vehicle distance $Dnf_{es\_n}$, and estimated inter-vehicle distance $Dnf_{es\_n-1}$ form lane change conditions. When the lane change conditions are extracted, it is determined that lane change is possible. When the lane change conditions are not extracted, it is determined that lane change is impossible. The area candidate in this case is the area sandwiched between the N−1th vehicle in front and the Nth vehicle in front. When it is determined that lane change is possible, the process proceeds to S240. When it is determined that lane change is impossible, the process proceeds to S270.

(E) The estimated inter-vehicle distance $Dnf_{es\_n}$ is equal to or more than the required inter-vehicle distance $Dnf_{th}$ (F) The estimated inter-vehicle distance $Dnf_{es\_n-1}$ is equal to or more than the required inter-vehicle distance $Dnr_{th}$ The estimated relative speed $\Delta Vnf_{es\_n}$ is the speed difference estimated as the relative speed between the own vehicle and the Nth vehicle in front when speed adjustment is performed after the standby time Tw has elapsed. The estimated relative speed $\Delta Vnf_{es\_n-1}$ is the speed difference estimated as the relative speed between the own vehicle and the N−1th vehicle in front when speed adjustment is performed after the standby time Tw has elapsed.

The N−1th vehicle in front corresponds to the first vehicle in front. The first vehicle in front is the one of the own vehicle and the two vehicles in front that is relatively located at the back. The Nth vehicle in front corresponds to the second vehicle in front. The second vehicle in front is the one of the own vehicle and the two vehicles in front that is relatively located at the front. The estimated inter-vehicle distance $Dnf_{es\_n-1}$ corresponds to the first estimated distance. The estimated inter-vehicle distance $Dnf_{es\_n}$ corresponds to the second estimated distance. The required inter-vehicle distance $Dnf_{th}$ corresponds to the first required distance. The required inter-vehicle distance $Dnr_{th}$ corresponds to the second required distance.

Figure 7:
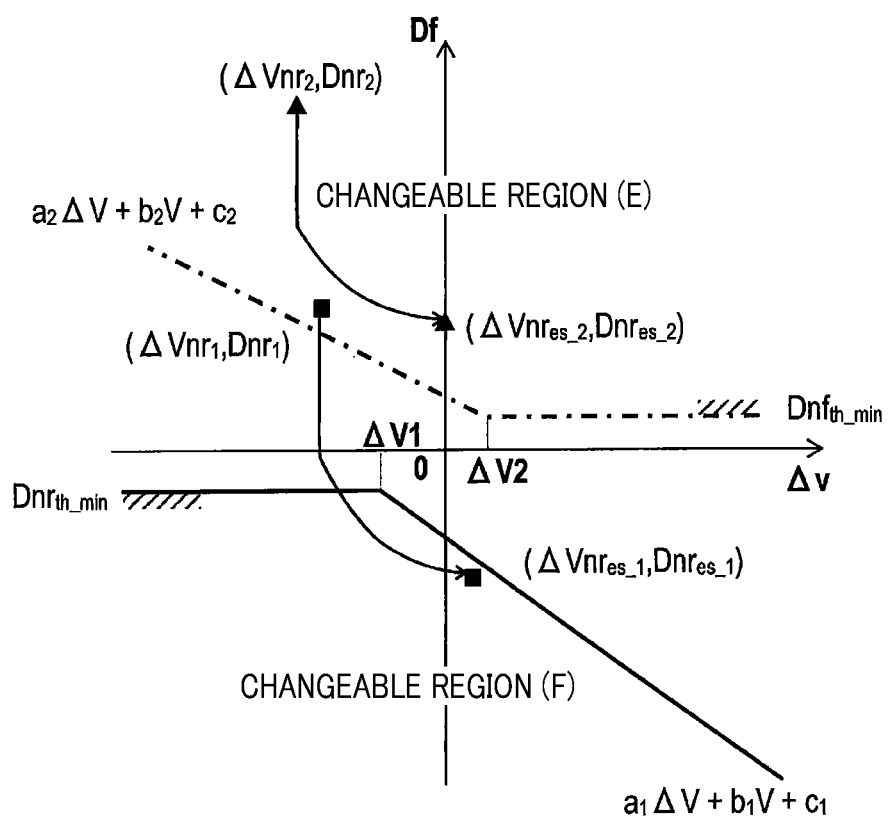
FIG. 7 is an explanatory diagram of the support process.

FIG. 7 shows an example graph in a two-dimensional plane in which the abscissa represents the relative speed $\Delta V$ between the own vehicle and the vehicle in front and the ordinate represents the relative distance Df between the own vehicle and the vehicle in front. In FIG. 7, the relative speed and the relative distance between the own vehicle and the vehicle in front are positive, and the relative speed and the relative distance between the own vehicle and the vehicle behind are negative. In FIG. 7, a case where the variable N is the numerical value 2 will be exemplified. In this graph, the part above the one-dot chain line is a changeable region (E) that satisfies the condition (E). In this graph, the part below the thick solid line is a changeable region (F) that satisfies the condition (F). The changeable region (E) is a region in which it is determined that lane change is possible with regard to the positional relationship between the own vehicle and the Nth vehicle in front. The changeable region (F) is a region in which it is determined that lane change is possible with regard to the positional relationship between the own vehicle and the N−1th vehicle in front. When the standby time Tw the target speed $V_{es}$ of the own vehicle, and the estimated inter-vehicle distance $Dnf_{es\_n}$ are in the changeable region (E), and the standby time Tw, the target speed $V_{es}$ of the own vehicle, and the estimated inter-vehicle distance $Dnf_{es\_n-1}$ are in the changeable region (F), the support device 1 determines that lane change to the area candidate is possible. In this case, the extracted standby time Tw, target speed $V_{es}$ of the own vehicle, estimated inter-vehicle distance $Dnf_{es\_n}$, and estimated inter-vehicle distance $Dnf_{es\_n-1}$ are used as the lane change conditions. When the standby time Tw, the target speed $V_{es}$ of the own vehicle, and the estimated inter-vehicle distance $Dnf_{es\_n}$ are outside the changeable region (E), or the standby time Tw, the target speed $V_{es}$ of the own vehicle, and the estimated inter-vehicle distance $Dnf_{es\_n-1}$ are outside the changeable region (F), the support device 1 determines that lane change to the area candidate is impossible.

In S240, the support device 1 sets the area between the Nth vehicle in front and the N−1th vehicle in front as the lane change area which is the area where lane change is performed. After that, the process proceeds to S250.

In S250, the support device 1 determines whether the standby time Tw is the numerical value zero. When the standby time Tw is the numerical value zero, the process proceeds to S260. When the standby time Tw is not the numerical value zero, the process proceeds to S230.

Figure 10:
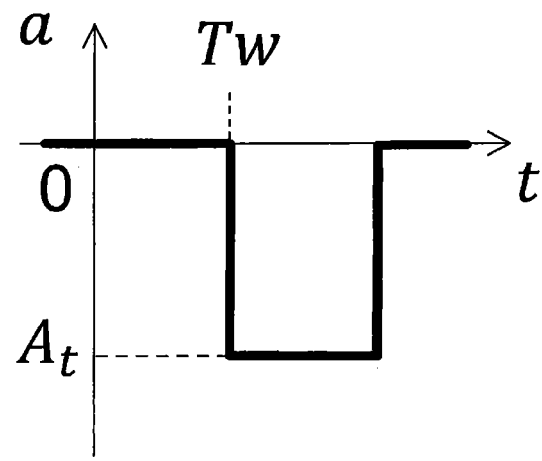
FIG. 10 is an explanatory diagram of the support process.
Figure 11:
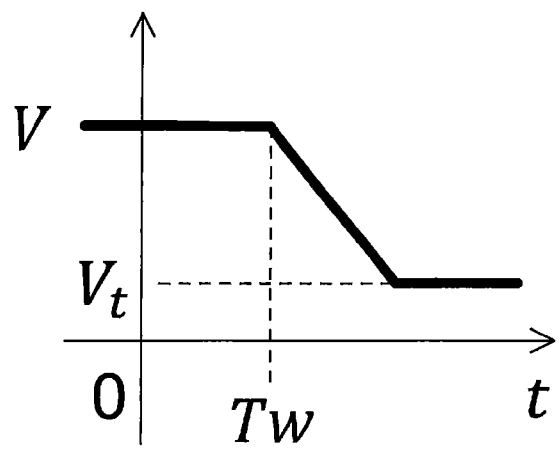
FIG. 11 is an explanatory diagram of the support process.

In S260, the support device 1 adjusts the speed of the own vehicle. Specifically, the support device 1 performs speed adjustment according to the acceleration profile. FIG. 10 shows an example graph in a two-dimensional plane in which the abscissa represents the time t and the ordinate represents the acceleration a of the own vehicle. In this graph, the acceleration profile indicates that the own vehicle is accelerated with an acceleration At from the standby time Tw for a predetermined time. Here, the acceleration At has a negative value, and the own vehicle decelerates. The predetermined time and the acceleration At are preset from the viewpoint of reducing the speed difference between the own vehicle and the vehicles in front and behind. FIG. 11 shows an example graph in a two-dimensional plane in which the abscissa represents the time t and the ordinate represents the speed V of the own vehicle. This graph shows that the speed of the own vehicle changes from the speed V to the speed Vt by the own vehicle decelerating with the acceleration At from the standby time Tw for the predetermined time according to the acceleration profile. In the present embodiment, the traveling speed Vt of the own vehicle is set so as to coincide with the target speed $V_{es}$. After that, the process proceeds to S410.

In S270, the support device 1 increments the variable N. After that, the process proceeds to S280.

In S280, the support device 1 determines whether the variable N is more than the variable I. When the variable N is larger than the variable I, the process proceeds to S290. When the variable N is equal to or less than the variable 1, the process proceeds to S200.

In S290, the support device 1 notifies the occupant that lane change is impossible. Specifically, the support device 1 controls the HMI system 26 to notify the driver via voice, display, or the like that lane change is impossible. After that, the process ends.

In S300, the support device 1 sets the variable N to the numerical value 2. After that, the process proceeds to S310.

In S310, the support device 1 determines the standby time Tw. Specifically, the support device 1 calculates the standby time Tw. The standby time Tw is calculated according to Equation (6). After that, the process proceeds to S320.

In S320, the support device 1 determines whether lane change to the area candidate is possible after the lapse of the standby time Tw. Specifically, the support device 1 determines that lane change to the area candidate is possible when both of the following conditions (G) and (H) are met. Otherwise, it is determined that lane change to the area candidate is impossible. The area candidate in this case is the area sandwiched between the N−1th vehicle behind and the Nth vehicle behind. When it is determined that lane change is possible, the process proceeds to S330. When it is determined that lane change is impossible, the process proceeds to S340.

(G) The estimated inter-vehicle distance $Dnr_{es\_n-1}$ is equal to or more than the required inter-vehicle distance $Dnf_{th}$ (H) The estimated inter-vehicle distance $Dnr_{es\_n}$ is equal to or more than the required inter-vehicle distance $Dnr_{th}$ The estimated inter-vehicle distance $Dnr_{es\_n-1}$ indicates the estimated inter-vehicle distance between the own vehicle and the N−1th vehicle behind. The estimated inter-vehicle distance $Dnr_{es\_n}$ indicates the estimated inter-vehicle distance between the own vehicle and the Nth vehicle behind. The estimated inter-vehicle distance $Dnr_{es\_n-1}$ is calculated according to Equation (9). The estimated inter-vehicle distance $Dnr_{es\_n}$ is calculated according to Equation (10).

[Eq. 5]

$$Dnr_{es_{n-1}} = Dnr_{n-1} + \Delta Vnr_{n-1} \cdot Tw \tag{9}$$

$$Dnr_{es\_n} = Dnr_n + \Delta Vnr_n \cdot Tw \tag{10}$$

In Equation (9), $\Delta Vnr_n$ represents the relative speed between the own vehicle and the Nth vehicle behind. In Equation (10), $\Delta Vnr_{n-1}$ represents the relative speed between the own vehicle and the N−1th vehicle behind.

In S330, the support device 1 determines whether the standby time Tw is the numerical value zero. When the standby time Tw is the numerical value zero, the process proceeds to S410. When the standby time Tw is not the numerical value zero, the process proceeds to S310.

In S340, the support device 1 determines whether lane change to the area candidate is possible after speed adjustment. Specifically, the support device 1 extracts the standby time Tw, the target speed $V_{es}$ of the own vehicle, the estimated inter-vehicle distance $Dnr_{es\_n}$, and the estimated inter-vehicle distance $Dnr_{es\_n-1}$ within the preset allowable ranges. The allowable ranges are ranges in which the traveling speed Vt of the own vehicle, the estimated inter-vehicle distance $Df_{es}$, the estimated inter-vehicle distance $Dnr_{es\_n}$, the estimated inter-vehicle distance $Dn_{es\_n-1}$, the estimated relative speed $\Delta Vf_{es}$, the estimated relative speed $\Delta Vnr_{es\_n}$, and the estimated relative speed $\Delta Vnr_{es\_n-1}$ satisfy all of the following conditions (I), (J), and (K). The extracted standby time Tw, target speed $V_{es}$ of the own vehicle, estimated inter-vehicle distance $Dnr_{es\_n}$, and estimated inter-vehicle distance $Dnr_{es\_n-1}$ form lane change conditions. When the lane change conditions are extracted, it is determined that lane change is possible. When the lane change conditions are not extracted, it is determined that lane change is impossible. The area candidate in this case is the area sandwiched between the N−1th vehicle behind and the Nth vehicle behind. When it is determined that lane change is possible, the process proceeds to S350. When it is determined that lane change is impossible, the process proceeds to S380.

(I) The estimated inter-vehicle distance $Df_{es}$ is equal to or more than the required inter-vehicle distance $Df_{th}$ (J) The estimated inter-vehicle distance $Dnr_{es\_n-1}$ is equal to or more than the required inter-vehicle distance $Dnf_{th}$ (K) The estimated inter-vehicle distance $Dnr_{es\_n}$ is equal to or more than the required inter-vehicle distance $Dnr_{th}$ The estimated relative speed $\Delta Vnr_{es\_n}$ is the speed difference estimated as the relative speed between the own vehicle and the Nth vehicle behind when speed adjustment is performed after the standby time Tw has elapsed. The estimated relative speed $\Delta Vnr_{es\_n}$ is the speed difference estimated as the relative speed between the own vehicle and the N−1th vehicle behind when speed adjustment is performed after the standby time Tw has elapsed. The estimated inter-vehicle distance $Df_{es}$ indicates a distance estimated as the distance between the own vehicle and the forward vehicle when lane change is performed. The required inter-vehicle distance $Df_{th}$ is the distance that should be secured between the own vehicle and the forward vehicle when the own vehicle changes lanes. The estimated inter-vehicle distance $Df_{es}$ is calculated according to Equation (11). The required inter-vehicle distance $Df_{th}$ is calculated according to Equation (12).

[Eq. 6]

$$Df_{es} = Df_1 + \Delta Vf_1 \cdot Tw \quad (11)$$

$$Df_{th} = \begin{cases} a_3 \Delta V + b_3 V + c_3 & (\Delta V_f < \Delta V_3) \\ Df_{th\_min} & (\Delta V_f \geq \Delta V_3) \end{cases} \quad (12)$$

The N−1th vehicle behind corresponds to the first vehicle behind. The first vehicle behind is the one of the own vehicle and two vehicles behind that is relatively located at the front. The Nth vehicle behind corresponds to the second vehicle behind. The second vehicle behind is the one of the own vehicle and two vehicles behind that is relatively located at the back. The estimated inter-vehicle distance $Dnf_{es\_n-1}$ corresponds to the estimated distance A (first estimated distance). The estimated inter-vehicle distance $Dnf_{es\_n}$ corresponds to the estimated distance B (second estimated distance). The estimated inter-vehicle distance $Df_{es}$ corresponds to the estimated distance C (third estimated distance). The required inter-vehicle distance $Dnf_{th}$ corresponds to the required distance A (first required distance). The required inter-vehicle distance $Dnr_{th}$ corresponds to the required distance B (second required distance). The required inter-vehicle distance $Df_{th}$ corresponds to the required distance C (third required distance).

Figure 9:
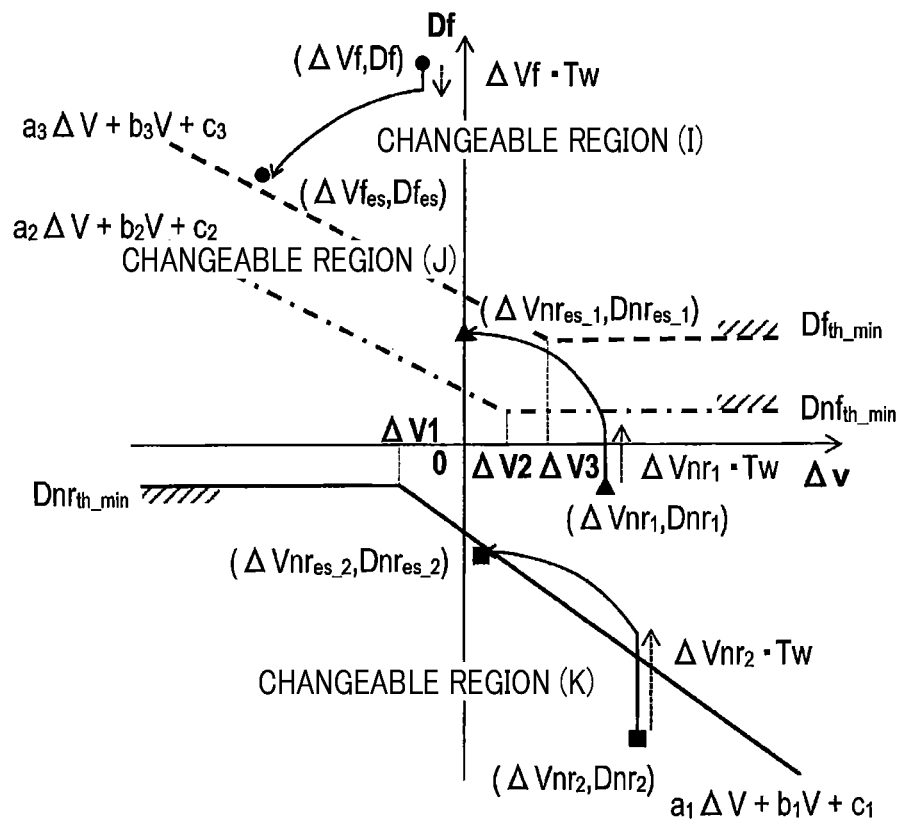
FIG. 9 is an explanatory diagram of the support process.

FIG. 9 shows an example graph in a two-dimensional plane in which the abscissa represents the relative speed $\Delta V$ between the own vehicle and the vehicle behind and the ordinate represents the relative distance Df between the own vehicle and the vehicle behind. In FIG. 9, the relative speed and the relative distance between the own vehicle and the vehicle in front are positive, and the relative speed and the relative distance between the own vehicle and the vehicle behind are negative. In FIG. 9, a case where the variable N is the numerical value 2 will be exemplified. In this graph, the part above the broken line is a changeable region (I) that satisfies the condition (I). In the graph, the part above the one-dot chain line is a changeable region (J) that satisfies the condition (J). In the graph, the part below the thick solid line is a changeable region (K) that satisfies the condition (K). The changeable region (I) is a region in which it is determined that lane change is possible with regard to the positional relationship between the own vehicle and the forward vehicle. The changeable region (J) is a region in which it is determined that lane change is possible with regard to the positional relationship between the own vehicle and the N−1th vehicle behind in the adjacent lane. The changeable region (K) is a region in which it is determined that lane change is possible with regard to the positional relationship between the own vehicle and the Nth vehicle behind in the adjacent lane. When the standby time Tw the target speed $V_{es}$ of the own vehicle, and the estimated inter-vehicle distance $Df_{es}$ are in the changeable region (I); the standby time Tw, the target speed $V_{es}$ of the own vehicle, and the estimated inter-vehicle distance $Dnr_{es\_n-1}$ are in the changeable region (J); and the standby time Tw, the target speed $V_{es}$ of the own vehicle, and the estimated inter-vehicle distance $Dnr_{es\_n}$ are in the changeable region (K), the support device 1 determines that lane change to the area candidate is possible. In this case, the extracted standby time Tw, target speed $V_{es}$ of the own vehicle, estimated inter-vehicle distance $Df_{es}$, estimated inter-vehicle distance $Dnr_{es\_n-1}$, and estimated inter-vehicle distance $Dnr_{es\_n}$ are used as the lane change conditions. When the standby time Tw, the target speed VS of the own vehicle, and the estimated inter-vehicle distance $Df_{es}$ are outside the changeable region (I); the standby time Tw, the target speed $V_{es}$ of the own vehicle, and the estimated inter-vehicle distance $Dnr_{es\_n-1}$ are outside the changeable region (J); or the standby time Tw, the target speed $V_{es}$ of the own vehicle, and the estimated inter-vehicle distance $Dnr_{es\_n}$ are outside the changeable region (K), the support device 1 determines that lane change to the area candidate is impossible.

In S350, the support device 1 sets the area between the N−1th vehicle behind and the Nth vehicle behind as the lane change area which is the area where lane change is performed. After that, the process proceeds to S360.

In S360, the support device 1 determines whether the standby time Tw is the numerical value zero. When the standby time Tw is the numerical value zero, the process proceeds to S370. When the standby time Tw is not the numerical value zero, the process proceeds to S340.

Figure 12:
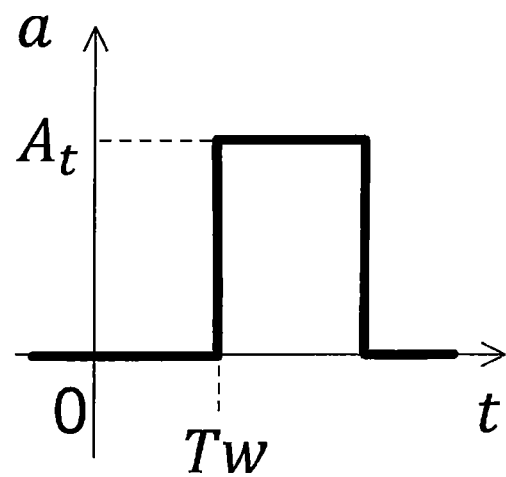
FIG. 12 is an explanatory diagram of the support process.
Figure 13:
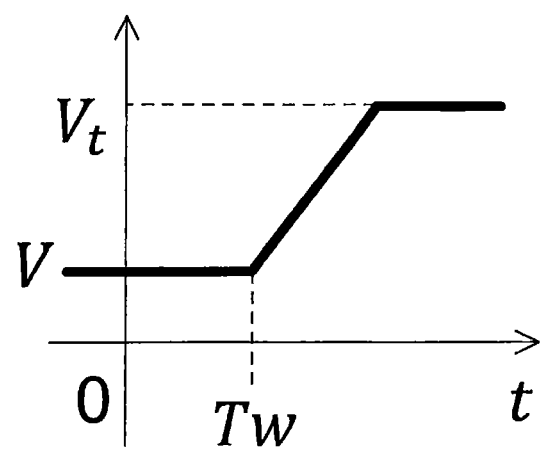
FIG. 13 is an explanatory diagram of the support process.

In S370, the support device 1 adjusts the speed of the own vehicle. Specifically, the support device 1 performs speed adjustment according to the acceleration profile. FIG. 12 shows an example graph in a two-dimensional plane in which the abscissa represents the time t and the ordinate represents the acceleration a of the own vehicle. In this graph, the acceleration profile indicates that the own vehicle is accelerated with an acceleration At from the standby time Tw for a predetermined time. Here, the acceleration At has a positive value, and the own vehicle accelerates. The predetermined time and the acceleration At are preset from the viewpoint of reducing the speed difference between the own vehicle and the vehicles in front and behind. FIG. 12 shows an example graph in a two-dimensional plane in which the abscissa represents the time t and the ordinate represents the speed V of the own vehicle. This graph shows that the speed of the own vehicle changes from the speed V to the speed Vt by the own vehicle accelerating with the acceleration At from the standby time Tw for the predetermined time according to the acceleration profile. In the present embodiment, the traveling speed Vt of the own vehicle is set so as to coincide with the target speed $V_{es}$. After that, the process proceeds to S410.

In S380, the support device 1 increments the variable N. After that, the process proceeds to S280.

In S390, the support device 1 determines whether the variable N is more than the variable J. When the variable N is larger than the variable J, the process proceeds to S400. When the variable N is equal to or less than the variable J, the process proceeds to S310.

In S400, the support device 1 notifies the occupant that lane change is impossible. Specifically, the support device 1 controls the HMI system 26 to notify the driver via voice, display, or the like that lane change is impossible. After that, the process ends.

In S410, the support device 1 controls the HMI system 26 and the wireless communication system 28 to notify the vehicles in front and behind and the forward vehicle via voice, display, communication, or the like that the own vehicle has an intention to change lanes. After that, the process proceeds to S420.

In S420, the support device 1 determines whether a predetermined time has elapsed. The predetermined time is the time needed to notify the vehicles in front and behind and the forward vehicle of the intention to change lanes. The predetermined time is set in advance through experiments or the like. When it is determined that the predetermined time has elapsed, the process proceeds to S430. When the predetermined time has not elapsed, S420 is executed again.

In S430, the support device 1 updates the information on the vehicles in front and behind. This process is the same as S120. After that, the process proceeds to S440.

In S440, the support device 1 sorts the information on the vehicles in front and behind. This process is the same as S130. After that, the process proceeds to S450.

In S450, the support device 1 updates the required inter-vehicle distance. This process is the same as S150. After that, the process proceeds to S460.

In S460, the support device 1 determines whether lane change is possible. This process is the same as S170. When it is determined that lane change is possible, the process proceeds to S470. When it is determined that lane change is impossible, the process proceeds to S490.

In S470, the support device 1 supports lane change. Specifically, the support device 1 controls the power train system 23, the brake system 24, and the steering system 25 to control the lateral position of the own vehicle (the position in the left-right direction). After that, the process proceeds to S480.

In S480, the support device 1 determines whether lane change has been completed. Specifically, the support device 1 controls the locator system 22 to determine whether the own vehicle is located in the adjacent lane. When the own vehicle is located in the adjacent lane, it is determined that lane change has been completed. When the own vehicle is not located in the adjacent lane, it is determined that lane change has not been completed. When it is determined that lane change has been completed, this process is terminated. When it is determined that lane change has not been completed, the process proceeds to S470.

In S490, the support device 1 notifies the occupant that lane change is impossible. Specifically, the support device 1 controls the HMI system 26 to notify the driver via voice, display, or the like that lane change is impossible. After that, the process ends.

3. Correspondence with the Claims

S150 corresponds to the calculation unit. S210 and S320 correspond to the detection unit. S230 and S340 correspond to the extraction unit and the determining unit. S240 and S350 correspond to the setting unit. S250. S260, S360, S370, S470 and S480 correspond to the supporting unit.

4. Effects

According to the present embodiment described above in detail, the following effects can be obtained.

That is, the standby time and the target speed used for estimating the estimated inter-vehicle distance are extracted within predetermined allowable ranges as the lane change conditions for the estimated inter-vehicle distance to be equal to or more than the required inter-vehicle distance. Then, the support device stands by until the standby time elapses, performs speed adjustment so that the traveling speed of the own vehicle reaches the target speed, and performs lane change to the lane change area of the own vehicle. Thus, by adjusting the speed to the target speed, it is possible to reduce the speed difference between the own vehicle and the adjacent vehicles at the time of lane change. Therefore, it is possible to prevent the inter-vehicle distance between the own vehicle and an adjacent vehicle decreasing in a short period of time after lane change, and further to prevent the occupant from feeling discomfort. That is, it is possible to perform lane change without making the occupant feel discomfort.

5. Other Embodiments

Embodiments for implementing the present disclosure has been described above, but the present disclosure is not limited to the above-described embodiments and can be implemented with various modifications.

(1) A plurality of functions realized by a single component of the above embodiment may be realized by a plurality of components, or a single function realized by a single component may be realized by a plurality of components. Further, a plurality of functions realized by a plurality of components may be realized by a single component, or a single function realized by a plurality of components may be realized by a single component. Furthermore, a part of the configuration of the above embodiments may be omitted. Furthermore, at least a part of the configuration of the above embodiment may be added or substituted in the configuration of the other embodiments described above. The embodiments of the present disclosure include any mode included in the technical spirit specified by the language of the claims.

(2) Besides the above-described support device 1, the present disclosure may be realized in various forms such as a system including the support device 1, a program for causing a computer to function as the support device 1, a non-transitory tangible computer readable medium such as a semiconductor memory storing the program, and a support method.

The invention claimed is:

1. A support device for supporting lane change of an own vehicle, the support device being communicable to at least one of a sensor and a communication device, the support device requiring information on adjacent vehicles via at least one of the sensor and the communication device, the support device comprising:
- a memory;
- a processor communicable to the memory; and
- a set of computer-executable instructions stored on the memory that cause the processor to implement;
- detecting one of a plurality of inter-vehicle areas as an area candidate which is a candidate for an area to which the own vehicle can perform lane change;
- calculating a required inter-vehicle distance which is a distance that should be secured between the own vehicle and a nearby vehicle when the own vehicle can perform lane change to the area candidate;
- extracting, within preset allowable ranges, a standby time and a target speed used for estimating an estimated inter-vehicle distance as lane change conditions which are conditions for the estimated inter-vehicle distance to be equal to or more than the required inter-vehicle distance;
- determining that lane change to the area candidate is possible in response to having extracted the lane change conditions, and determining that lane change to the area candidate is impossible in response to having not extracted the lane change conditions;
- setting the area candidate as a lane change area which is the area to which the own vehicle can perform lane change in response to determining that lane change to the area candidate is possible; and
- in response to having set the lane change area, standing by until the standby time elapses, performing speed adjustment so that a traveling speed of the own vehicle reaches the target speed, and controlling at least one of a power train system, brake system and steering system so that the own vehicle performs lane change to the lane change area of the own vehicle, wherein the adjacent lane is a lane adjacent to a lane in which the own vehicle is traveling, the inter-vehicle area is an area sandwiched between two adjacent vehicles in an anterior-posterior relationship with each other, the adjacent vehicles being vehicles traveling in the adjacent lane, the nearby vehicle is a vehicle traveling nearby the own vehicle when the own vehicle can perform lane change to the area candidate, the standby time is a time for standing by until the own vehicle can perform lane change to the area candidate, which is calculated based on the required inter-vehicle distance, a relative distance between the own vehicle and the nearby vehicle, and a relative speed of the nearby vehicle with respect to the own vehicle, the relative distance and the relative speed are required from the nearby vehicle by using at least one of the sensor and the communication device, the target speed is a target traveling speed of the own vehicle used as a target when performing speed adjustment to reduce a speed difference with respect to the adjacent vehicles after the standby time has elapsed, which is calculated based on the relative distance and the relative speed of the nearby vehicle with respect to the own vehicle, the estimated inter-vehicle distance is an estimated distance between the own vehicle and the nearby vehicle when speed adjustment is performed so that the traveling speed of the own vehicle reaches the target speed after the standby time has elapsed, which is calculated based on the standby time and the relative distance and the relative speed of the nearby vehicle with respect to the own vehicle, each of the allowable ranges is a range in which it is determined that lane changing is possible with regard to a positional relationship between the own vehicle and the nearby vehicle, the range is defined using the relative distance and the relative speed of the nearby vehicle with respect to the own vehicle, and the allowable ranges change in response to a speed difference of between the own vehicle and the nearby vehicle at the time of lane change.

2. The support device according to claim 1, wherein
when the adjacent vehicles are slower than the own vehicle, the process detects one of the plurality of the inter-vehicle areas sandwiched between two adjacent vehicles traveling in front of the own vehicle as the area candidate.

3. The support device according to claim 2, wherein
the processor calculates a first required distance which is the required inter-vehicle distance for a first vehicle in front, and a second required distance which is the required inter-vehicle distance for a second vehicle in front, the processor determines the lane change conditions as conditions for satisfying that a first estimated distance, which is the estimated inter-vehicle distance for the first vehicle in front, is equal to or more than the first required distance, and a second estimated distance, which is the estimated inter-vehicle distance for the second vehicle in front, is equal to or more than the second required distance, and the two adjacent vehicles are the adjacent vehicles traveling in front of the own vehicle, the first vehicle in front is one of the two adjacent vehicles that is located behind an other one of the two adjacent vehicles, and the second vehicle in front is the other one of the two adjacent vehicles that is located ahead of the first vehicle.

4. The support device according to claim 1, wherein
when the adjacent vehicles are faster than the own vehicle, the processor detects one of the plurality of the inter-vehicle areas sandwiched between two adjacent vehicles traveling behind the own vehicle as the area candidate.

5. The support device according to claim 4, wherein
the processor it calculates a first required distance A which is the required inter-vehicle distance for a first vehicle behind, a second required distance B which is the required inter-vehicle distance for a second vehicle behind, and a third required distance C which is the required inter-vehicle distance for a forward vehicle, the processor determines the lane change conditions as conditions for satisfying that a first estimated distance A, which is the estimated inter-vehicle distance for the first vehicle behind, is equal to or more than the first required distance A, a second estimated distance B, which is the estimated inter-vehicle distance for the second vehicle behind, is equal to or more than the second required distance B, and a third estimated distance C, which is the estimated inter-vehicle distance for the forward vehicle, is equal to or more than the third required distance C, and the two adjacent vehicles are the adjacent vehicles traveling behind the own vehicle, the first vehicle behind is one of the two adjacent vehicles that is located ahead of an other one of the two adjacent vehicles, the second vehicle behind is the other one of the two adjacent vehicles that is located behind the first vehicle, and the forward vehicle is a vehicle traveling in front of the own vehicle in the lane in which the own vehicle is traveling.

6. The support device according to claim 1, wherein the processor sequentially detects, as the area candidate, the inter-vehicle areas in ascending order of a distance from the own vehicle, starting from one with a smallest distance.

7. The support device according to claim 1, wherein when the nearby vehicle is slower than the own vehicle, each of the allowable ranges is decided by a first range in which it is determined that lane change is possible with regard to a first positional relationship between the own vehicle and the nearby vehicle traveling in front of the own vehicle.

8. The support device according to claim 1, wherein when the nearby vehicle is faster than the own vehicle, each of the allowable ranges is decided by a second range in which it is determined that lane change is possible with regard to a second positional relationship between the own vehicle and the nearby vehicle traveling in behind of the own vehicle and a third range in which it is determined that lane change is possible with regard to a third positional relationship between the own vehicle and a forward vehicle traveling in front of the own vehicle in the lane in which the own vehicle is traveling.

9. The support device according to claim 1, wherein the processor determines whether lane change to the area candidate is possible if the standby time passes, in response to determining that lane change to the area candidate is not possible after pass of the standby time, the processor determines whether lane change to the area candidate is possible if speed adjustment is performed, in response to determining that lane change to the area candidate is not possible after speed adjustment, the processor sequentially detects, as the area candidate, the inter-vehicle areas in ascending order of a distance from the own vehicle, starting from one with a smallest distance, and in response to determining that lane change to the area candidate is possible after speed adjustment, the processor:

set the area candidate as the lane change area, the area candidate is an area which is detected as one of the inter-vehicle areas sandwiched between two adjacent vehicles traveling in front of the own vehicle; or set the area candidate as the lane change area, the area candidate is an area which is detected as one of the inter-vehicle areas sandwiched between two adjacent vehicles traveling in behind of the own vehicle.

* * * * *